United States Patent
Kurokawa et al.

(10) Patent No.: US 9,367,732 B2
(45) Date of Patent: Jun. 14, 2016

(54) INFORMATION PROCESSING DEVICE, INFORMATION PROCESSING METHOD, AND RECORDING MEDIUM

(75) Inventors: Takafumi Kurokawa, Osaka (JP); Ryohtaroh Tanimura, Osaka (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 165 days.

(21) Appl. No.: 14/112,294

(22) PCT Filed: Apr. 27, 2012

(86) PCT No.: PCT/JP2012/061471
§ 371 (c)(1),
(2), (4) Date: Oct. 17, 2013

(87) PCT Pub. No.: WO2012/147961
PCT Pub. Date: Nov. 1, 2012

(65) Prior Publication Data
US 2014/0247964 A1    Sep. 4, 2014

(30) Foreign Application Priority Data

Apr. 28, 2011  (JP) .................................. 2011-102529

(51) Int. Cl.
*G06K 9/00* (2006.01)
*G06F 3/00* (2006.01)
(Continued)

(52) U.S. Cl.
CPC ............ *G06K 9/00355* (2013.01); *G06F 3/005* (2013.01); *G06F 3/017* (2013.01);
(Continued)

(58) Field of Classification Search
CPC ... G06F 3/017; G06F 3/0304; G06K 9/00355; G06K 9/00389; G06K 9/525; G06K 9/44; G06T 2207/30196; G06T 2207/10016; G06T 2207/10024
See application file for complete search history.

(56) References Cited

U.S. PATENT DOCUMENTS 6,002,808 A * 12/1999 Freeman ....................... 382/288
6,115,482 A    9/2000 Sears et al.
(Continued)

FOREIGN PATENT DOCUMENTS

CN        1595336 A     3/2005
CN      101901350 A    12/2010
(Continued)

OTHER PUBLICATIONS

Pavlovic, Visual Interpretation of Hand Gestures for Human-Computer Interaction: A Review, IEEE Transactions on Pattern Analysis and Machine Intelligence, vol. 19, No. 7, July 1997.*
(Continued)

*Primary Examiner* — Stephen R Koziol
*Assistant Examiner* — Pinalben Patel
(74) *Attorney, Agent, or Firm* — Finnegan, Henderson, Farabow, Garrett & Dunner LLP

(57) ABSTRACT

An image inputter inputs image data in which a user has been captured. An extractor extracts a region corresponding to a hand of the user included in the image data input by the image inputter. A determinator determines whether or not the region corresponding to the hand of the user extracted by the extractor is in a stationary state. If it is determined by the determinator that the region corresponding to the hand of the user is in a stationary state, a recognizer recognizes the shape of the region corresponding to the hand of the user extracted by the extractor. Otherwise, if it is determined by the determinator that the region corresponding to the hand of the user is not in a stationary state, the recognizer recognizes the movement of the region corresponding to the hand of the user extracted by the extractor. An inputter inputs data associated with the shape or the movement recognized by the recognizer.

9 Claims, 14 Drawing Sheets

(51) Int. Cl.
  *G06F 3/01* (2006.01)
  *G06F 3/03* (2006.01)
  *G06T 7/20* (2006.01)
  *G06K 9/44* (2006.01)
  *G06K 9/52* (2006.01)

(52) U.S. Cl.
  CPC ......... *G06F 3/0304* (2013.01); *G06K 9/00389* (2013.01); *G06T 7/2053* (2013.01); *G06K 9/44* (2013.01); *G06K 9/525* (2013.01); *G06T 2207/10016* (2013.01); *G06T 2207/10024* (2013.01); *G06T 2207/30196* (2013.01)

(56) References Cited

U.S. PATENT DOCUMENTS

| | | | | |
|---|---|---|---|---|
| 6,191,773 | B1 * | 2/2001 | Maruno | G06F 3/017 345/156 |
| 2005/0063564 | A1 | 3/2005 | Yamamoto et al. | |
| 2005/0271279 | A1 * | 12/2005 | Fujimura et al. | 382/203 |
| 2008/0052643 | A1 * | 2/2008 | Ike et al. | 715/863 |
| 2009/0110292 | A1 | 4/2009 | Fujimura et al. | |
| 2012/0224040 | A1 * | 9/2012 | Wang | 348/77 |
| 2013/0329011 | A1 * | 12/2013 | Lee | G06T 17/00 348/46 |
| 2014/0172231 | A1 * | 6/2014 | Terada | G06F 3/005 701/36 |
| 2015/0055836 | A1 * | 2/2015 | Moteki | G06K 9/00355 382/124 |
| 2015/0139487 | A1 * | 5/2015 | Aliseychik | G06K 9/00355 382/103 |
| 2015/0242683 | A1 * | 8/2015 | Tang | G06K 9/00389 382/173 |
| 2015/0255005 | A1 * | 9/2015 | Yoda | G09B 23/288 434/265 |
| 2015/0309581 | A1 * | 10/2015 | Minnen | G06F 3/017 345/156 |

FOREIGN PATENT DOCUMENTS

| | | |
|---|---|---|
| DE | 196 12 949 C1 | 8/1997 |
| EP | 0 800 145 A2 | 3/1997 |
| JP | 9-185456 | 7/1997 |
| JP | 10-063864 | 3/1998 |
| JP | 2001-307107 | 11/2001 |
| JP | 2002-196855 | 7/2002 |
| JP | 2002-259989 | 9/2002 |
| JP | 2005-242694 | 9/2005 |
| JP | 2005-301693 | 10/2005 |
| JP | 2006-099749 | 4/2006 |
| JP | 2007-164814 | 6/2007 |
| JP | 2009-042796 | 2/2009 |
| JP | 2011-065652 | 3/2011 |
| WO | WO 2009/055148 | 4/2009 |

OTHER PUBLICATIONS

K.L. Lee et al., "Rotative Finger Mouse using a Camera", Korea Human-Computer Interaction Society Annual Conference, pp. 961-966, 2005.

Notification of Submission of Opinion mailed Sep. 22, 2014 by the Korean Patent Office in counterpart Korean Patent Application No. 10-2013-7027984.

International Search Report mailed on Jun. 26, 2012.

Extended European Search Report mailed on Dec. 15, 2014 by the European Patent Office in counterpart European Patent Application No. 12777151.7.

Notification of Reasons for Rejection mailed on Jun. 17, 2014 by the Japanese Patent Office in counterpart Japanese Patent Application No. 2013-512494.

Office Action issued by the Chinese Patent Office in counterpart Chinese Patent Application No. 201280020651.6, dated Aug. 26, 2015.

H.Y. Ding et al., "Arithmetic of Gesture Recognition Using Multi-Scale Model and Moment-Describe", Journal of Northern Jiaotong University, vol. 28, No. 2, Apr. 2004.

Office Action issued by the Chinese Patent Office in counterpart Chinese Patent Application No. 201280020651.6, dated Mar. 7, 2016.

* cited by examiner

FIG.13
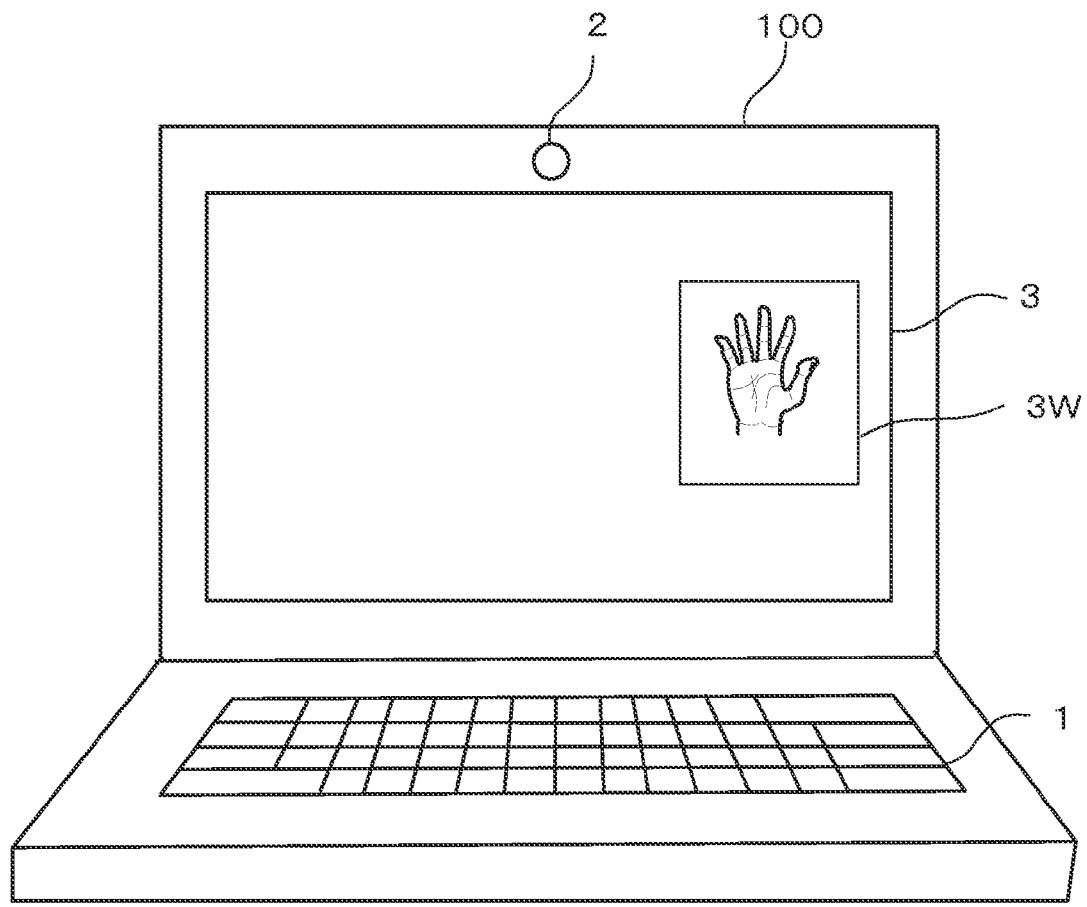
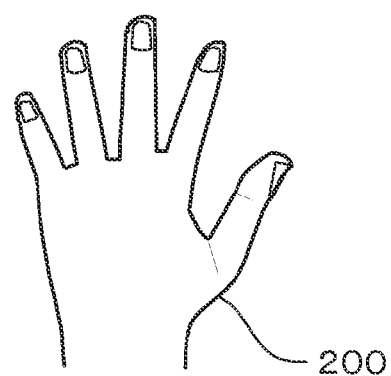

INFORMATION PROCESSING DEVICE, INFORMATION PROCESSING METHOD, AND RECORDING MEDIUM

CROSS-REFERENCE TO RELATED PATENT APPLICATIONS

This application is a National Stage Entry of International Application No. PCT/JP2012/061471, filed Apr. 27, 2012, which claims priority from Japanese Patent Application No. 2011-102529, filed Apr. 28, 2011. The entire contents of the above-referenced applications are expressly incorporated herein by reference.

TECHNICAL FIELD

The present invention relates to an information processing device, an information processing method, and a recording medium.

BACKGROUND ART

So-called gesture input devices are known which operate equipment in a non-contact manner by means of the movement of a hand captured by an optical camera.

For example, in Patent Literature 1, a pointing gesture detection method and device are disclosed, in which 8 or 16 video cameras are arranged in a radial form, and the movement of a hand of a person in the center thereof is detected.

Furthermore, in Patent Literature 2, a hand gesture recognition device is disclosed, in which the palm of a hand that has been modeled in advance is captured by a plurality of video cameras, a center of gravity skeleton value from the center of gravity of the hand to the edge of the hand is calculated, and an angle of rotation about the principal axis of the hand is estimated by means of a maximum likelihood method.

Furthermore, in Patent Literature 3, an image processing device and method are disclosed, in which the movement distribution of an image region of a hand captured by a video camera is calculated, and movement of the center of gravity of the region is detected to recognize the action of making a fist.

CITATION LIST

Patent Literature

Patent Literature 1: Unexamined Japanese Patent Application Kokai Publication No. 2002-259989.
Patent Literature 2: Unexamined Japanese Patent Application Kokai Publication No. H10-63864.
Patent Literature 3: Unexamined Japanese Patent Application Kokai Publication No. 2001-307107.

SUMMARY OF INVENTION

Technical Problem

In the case where an input instruction is carried out by the movement of a hand captured by an optical camera, when the movement of the hand is quick, a residual image in the image sometimes occurs due to the influence of illumination conditions and the like. Consequently, there is a case of a decline in recognition accuracy and of erroneous input occurring. Furthermore, due to the distance between the camera and an operator and differences in the sizes of the hands of operators, there is a case of it not being possible to accurately recognize a hand region in the image, the influence of external noise being received, and erroneous input occurring.

The present invention takes the aforementioned circumstances into consideration, and an objective thereof is to provide an information processing device, an information processing method, and a recording medium, with which it is possible for data to be input with higher accuracy.

Solution to Problem

An information processing device according to a first aspect of the present invention comprises:
an image inputter that inputs image data in which a subject has been captured;
an extractor that extracts a region corresponding to a hand of the subject included in the image data input by the image inputter;
a determinator that determines whether or not the region corresponding to the hand of the subject extracted by the extractor is in a stationary state;
a recognizer that, if the region corresponding to the hand of the subject is determined by the determinator as being in a stationary state, recognizes the shape of the region corresponding to the hand of the subject extracted by the extractor; and
an inputter that inputs data associated with the shape recognized by the recognizer.

An information processing method according to a second aspect of the present invention comprises:
an image input step for inputting image data in which a subject has been captured;
an extraction step for extracting a region corresponding to a hand of the subject included in the image data input in the image input step;
a determination step for determining whether or not the region corresponding to the hand of the subject extracted in the extraction step is in a stationary state;
a recognizing step for, if the region corresponding to the hand of the subject is determined in the determination step as being in a stationary state, recognizing the shape of the region corresponding to the hand of the subject extracted in the extraction step; and
an input step for inputting data associated with the shape recognized in the recognizing step.

A program recorded on a recording medium according to a third aspect of the present invention causes a computer to function as:
an image inputter that inputs image data in which a subject has been captured;
an extractor that extracts a region corresponding to a hand of the subject included in the image data input by the image inputter;
a determinator that determines whether or not the region corresponding to the hand of the subject extracted by the extractor is in a stationary state;
a recognizer that, if the region corresponding to the hand of the subject is determined by the determinator as being in a stationary state, recognizes the shape of the region corresponding to the hand of the subject extracted by the extractor; and
an inputter that inputs data associated with the shape recognized by the recognizer.

Advantageous Effects of Invention

According to the present invention, it is possible for data to be input with higher accuracy.

BRIEF DESCRIPTION OF DRAWINGS

FIG. 13 is a drawing depicting an example of the displaying of an image of a hand in a display.

DESCRIPTION OF EMBODIMENTS

An information processing device 100 according to a mode of embodiment of the present invention is hereafter described with reference to FIG. 1 to FIG. 14.

The information processing device 100 according to the present mode of embodiment is provided with a gesture input function for inputting data (including instructions, commands, or the like) corresponding to a gesture by a hand 200 such as a movement, shape, or direction of the hand 200 of a user serving as a subject. The information processing device 100 is a common computer device. In the information processing device 100, data input by the aforementioned gesture input function is, for example, processed by arbitrary application software.

Figure 1:
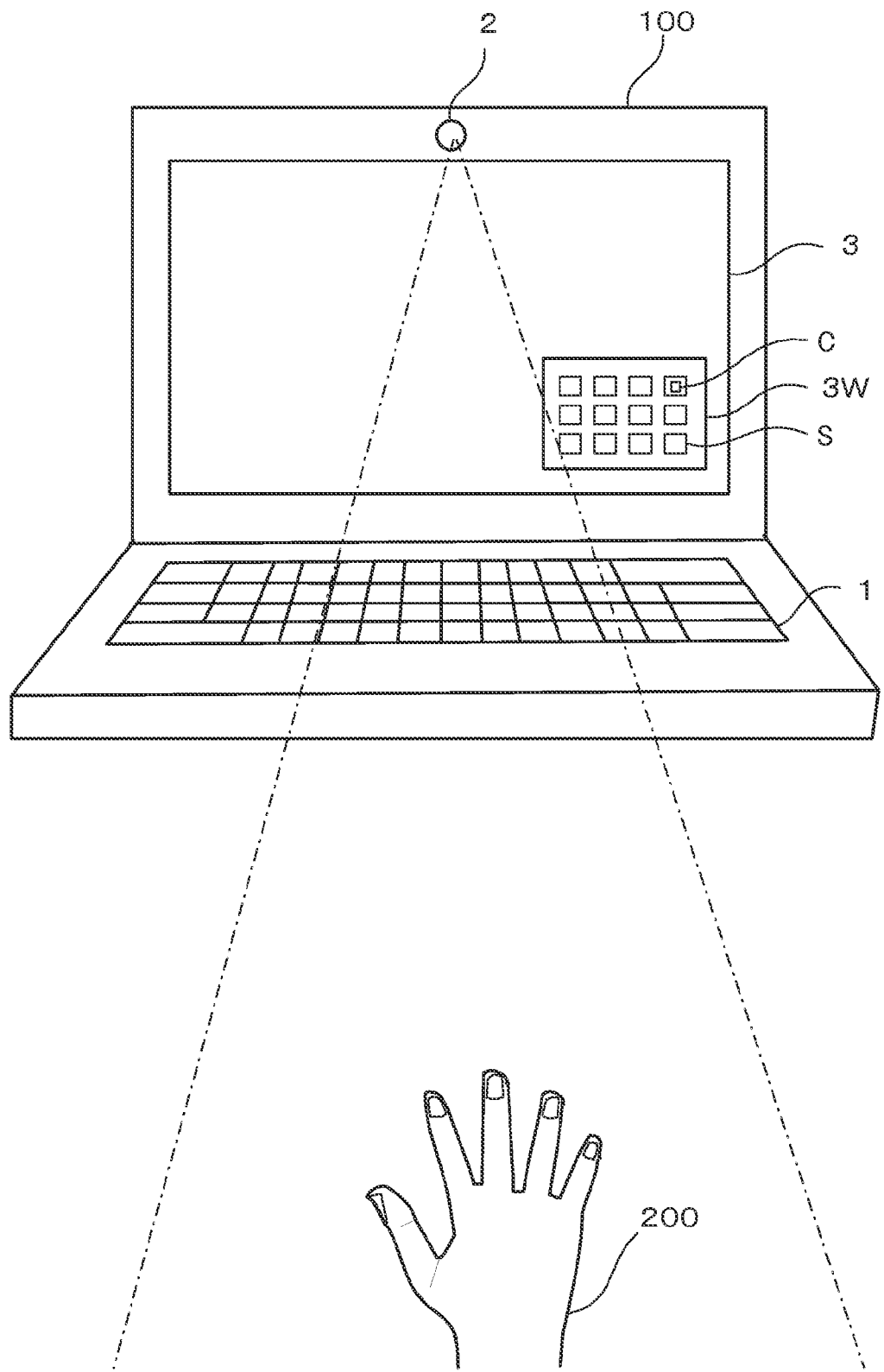
FIG. 1 is a perspective view of an information processing device according to a mode of embodiment of the present invention.

The information processing device 100, as depicted in FIG. 1, comprises an operator 1, a camera 2, and a display 3. The operator 1 comprises a keyboard, a mouse, and/or the like. The operator 1 inputs, to the information processing device 100, data such as a variety of commands, in accordance with operational input of the user.

The camera 2 comprises an imaging element such as a CCD (charge-coupled device) or CMOS (complementary metal-oxide semiconductor) sensor. The camera 2, for example, captures an image of the hand 200 of the user of the information processing device 100, as a subject positioned within the field of vision. The user inputs various data by gestures by the hand 200 with which the shape or movement of the hand 200 change within the field of vision of the camera 2.

The display 3 comprises a LCD (liquid crystal display) and the like. The display 3 displays an image relating to application software being executed by the information processing device 100. Furthermore, the display 3 displays a gesture input support window 3W constantly or in response to a predetermined operation. A selection target S such as a menu item, file, or icon, and a selection cursor C are displayed in the gesture input support window 3W.

Figure 2:
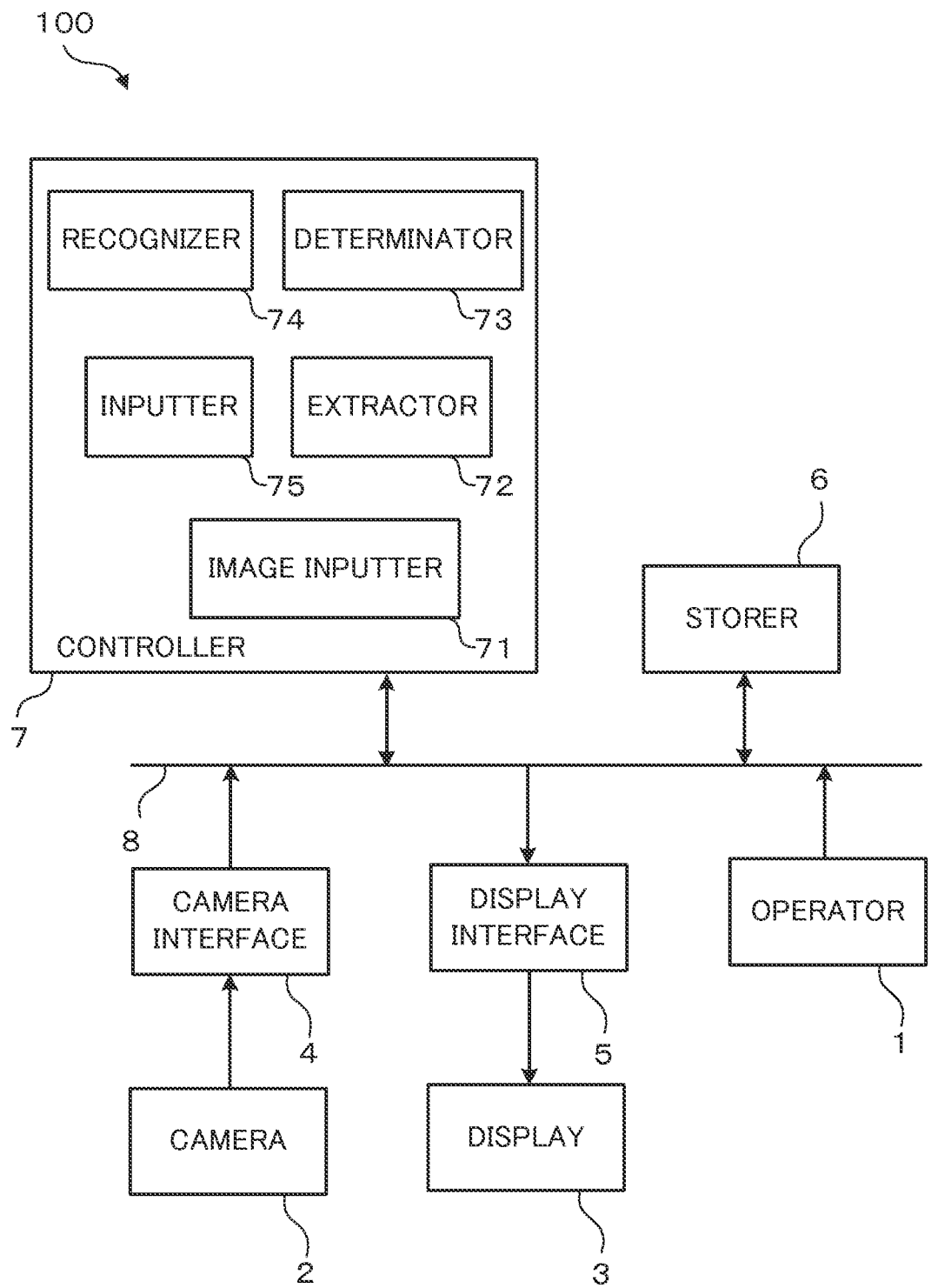
FIG. 2 is a functional block diagram of the information processing device of FIG. 1.

FIG. 2 depicts a functional configuration of the information processing device 100. The information processing device 100 comprises a camera interface 4, a display interface 5, a storer 6, and a controller 7 as well as the operator 1, the camera 2, and the display 3 which are described above. The operator 1, the camera interface 4, the display interface 5, the storer 6, and the controller 7 are connected to each other by a bus 8 in such a way that it is possible for data to be communicated therebetween. Furthermore, the camera 2 is connected to the camera interface 4, and the display 3 is connected to the display interface 5.

The camera interface 4 inputs, to the controller 7 by way of the bus 8, image data corresponding to an image captured by the camera 2. The display interface 5 inputs, to the display 3, image data input by the controller 7.

The storer 6 comprises a storage device such as a RAM (random-access memory) or a hard disk, and stores various types of data such as a program. The storer 6 stores the image data corresponding to the image captured by the camera 2. The storer 6 is able to store the image data in various formats. For example, the storer 6 stores the image data in frame units.

Furthermore, the storer 6 stores reference data for recognizing gestures (aspects such as movement, shape, and direction) by the hand 200. For example, reference data for recognizing the shape of the hand 200 is pattern data or the like for which the shape of the hand has been converted to data. Reference data for recognizing movement of the hand 200 is, for example, data relating to the amount of movement of the center of gravity of the hand 200 per unit time, or pattern data for which the locus of the center of gravity when the hand 200 has moved has been converted into data, or the like. The storer 6 stores reference data in association with data (including instructions, commands, or the like).

Figure 3:
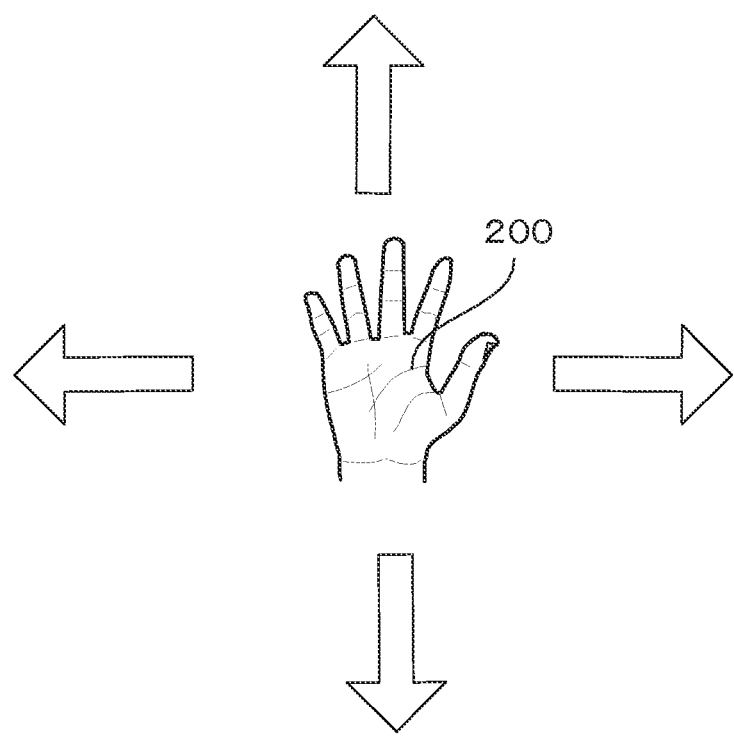
FIG. 3 is a drawing depicting an example of a hand movement as a gesture by a hand.

A gesture by the hand 200 recognized on the basis of the reference data is, for example, as depicted in FIG. 3, an upward, downward, leftward, or rightward movement of the hand 200. A command associated with this movement is, for example, a command for moving a cursor C in the direction of the movement, or for causing the screen to scroll in the direction of the movement. For example, if the hand 200 has moved upward, the cursor C moves upward. Furthermore, if the hand 200 has moved to the right, the cursor C moves to the right.

Figures 4A, 4B, 4C:
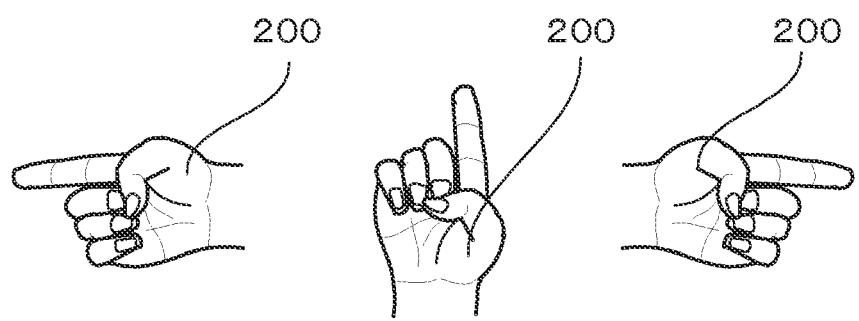
FIGS. 4A, 4B, and 4C are drawings depicting examples of shapes wherein the direction in which a finger points as a gesture by a hand is different.

Furthermore, gestures by the hand 200 recognized on the basis of the reference data are, as depicted in FIGS. 4A to 4C, shapes of the hand 200 that differ depending on the direction in which the index finger points. A command associated with these shapes is, for example, a command for moving a cursor C in the direction in which the index finger points, or for causing the screen to scroll in the direction in which the index finger points. For example, in FIG. 4A, because the direction in which the index finger points is left, the cursor C moves to the left. In FIG. 4B, because the direction in which the index finger points is up, the cursor C moves upward. In FIG. 4C, because the direction in which the index finger points is right, the cursor C moves to the right.

Figure 5A:
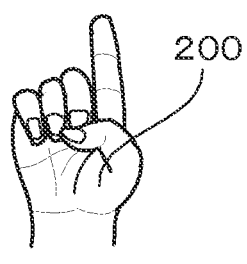
FIGS. 5A, 5B, and 5C are drawings depicting examples of shapes in which the number of fingers extended as a gesture by a hand is different.
Figure 5B:
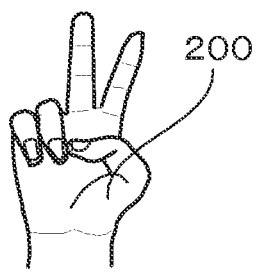
Figure 5C:
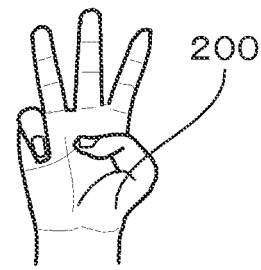

Furthermore, gestures by the hand 200 recognized on the basis of the reference data are, as depicted in FIGS. 5A to 5C, shapes of the hand 200 that differ by the number of extended fingers. A command associated with these shapes is, for example, a command for inputting numerical data that matches the number of extended fingers. In FIG. 5A, because the number of extended fingers is one, "1" is input. In FIG.

5B, because the number of extended fingers is two, "2" is input. In FIG. 5C, because the number of extended fingers is three, "3" is input.

The controller 7 comprises a processor or the like. The controller 7 executes the program stored in the storer 6 to execute data processing. The controller 7 executes ordinary data processing, and also executes data processing relating to the gesture input function. The controller 7 comprises an image inputter 71, an extractor 72, a determinator 73, a recognizer 74, and an inputter 75.

The image inputter 71 inputs image data in which a user serving as a subject has been captured. The image inputter 71 processes, in frame units, image data corresponding to an image captured by the camera 2, and causes the image data to be stored in the storer 6.

The extractor 72 extracts a region corresponding to the hand of the user included in the image data input by the image inputter 71. In order to extract the region corresponding to the hand of the user, the extractor 72 carries out the following image data processing. First, the extractor 72 sets a rectangle that circumscribes a movement region obtained from difference data between frames in the image data input by the image inputter 71.

In more detail, the extractor 72 refers to the storer 6, calculates difference data between image data of the frame unit currently processed and image data of the immediately preceding frame unit, and acquires image data corresponding to the movement region.

Figure 6:
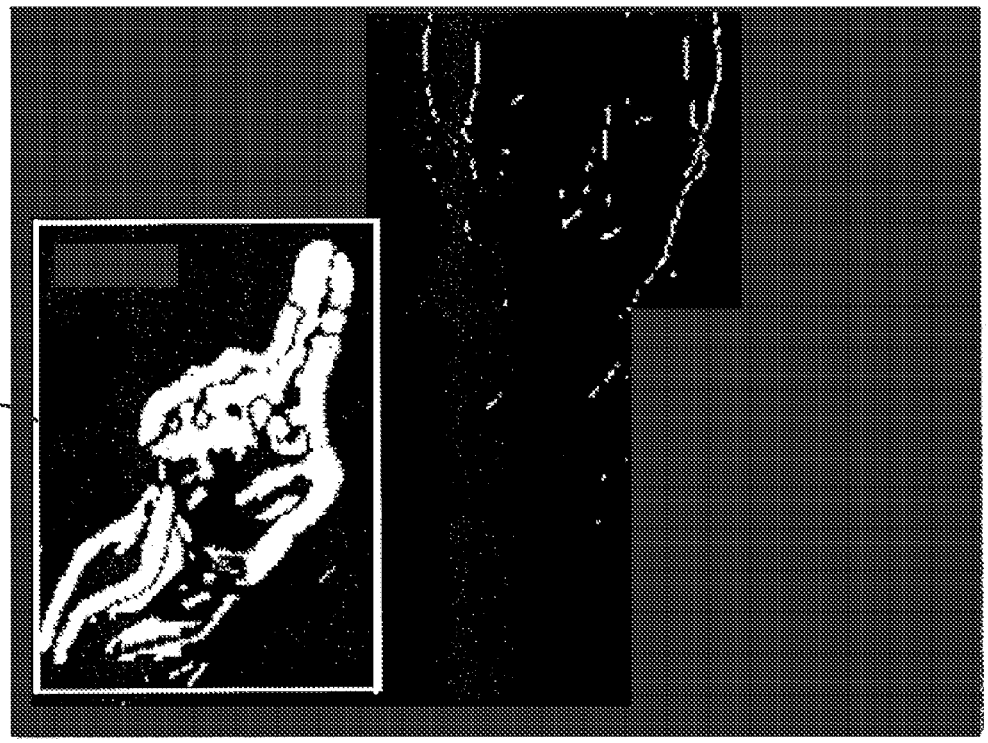
FIG. 6 is a drawing depicting a binarized image.
Figure 7:
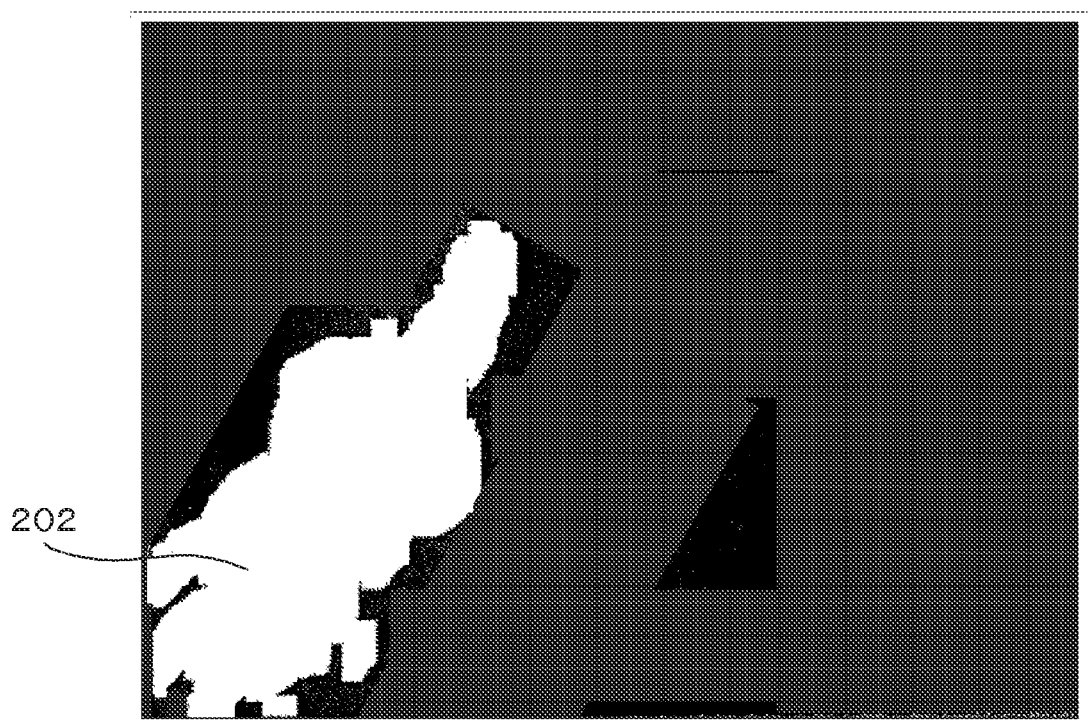
FIG. 7 is a drawing depicting a movement region specified from image data.
Figure 8:
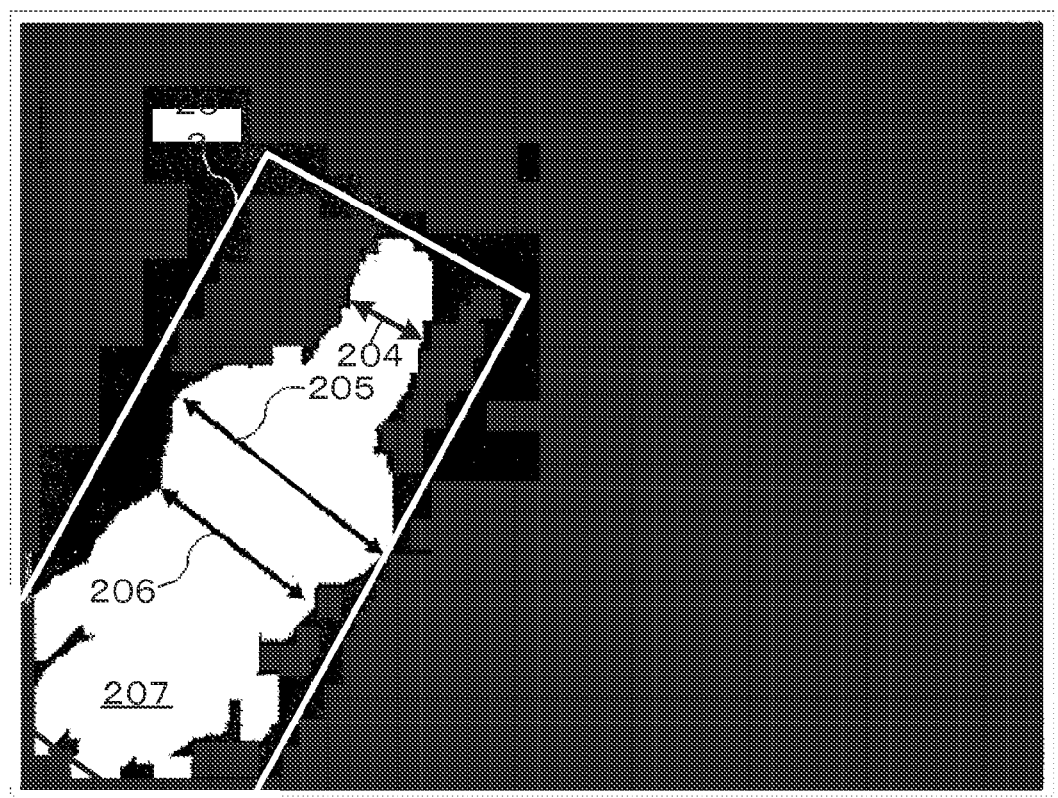
FIG. 8 is a drawing depicting a rectangle region that circumscribes the movement region.

Next, in order to extract the movement region, the extractor 72 binarizes the image corresponding to the acquired image data. FIG. 6 depicts a movement region 201 in a binarized image. If the eight neighboring pixel values surrounding each white pixel on the binarized image are greater than a preset threshold value, the extractor 72 expands the white pixel region. By doing this, the extractor 72 executes expansion processing for connecting and expanding white regions. Furthermore, if the eight neighboring pixel values surrounding each black pixel on the binarized image are less than a preset threshold value, the extractor 72 reduces the black pixel region. By doing this, the extractor 72 executes reduction processing for removing black dots that constitute noise. In this way, the extractor 72 specifies a movement region 202 from the image data, as depicted in FIG. 7. When the movement region 202 is specified, in addition, the extractor 72 sets the smallest rectangle region 203 that circumscribes the movement region 202, as depicted in FIG. 8.

Figure 9:
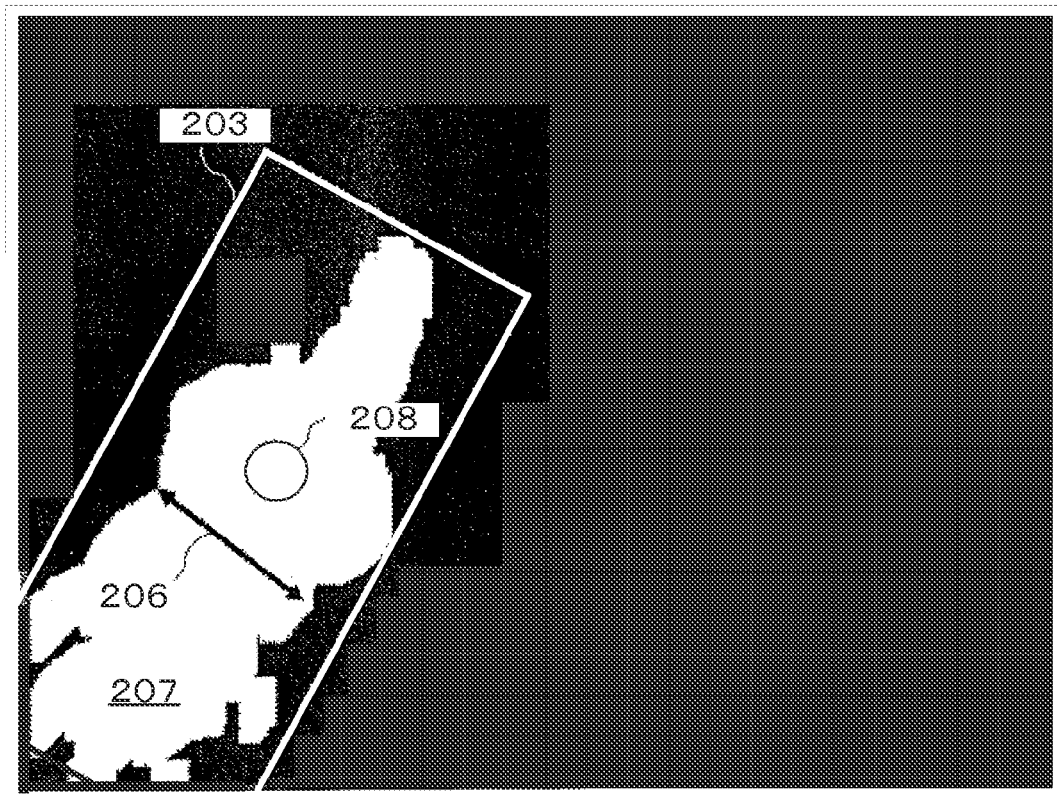
FIG. 9 is a drawing depicting a center of gravity and a region corresponding to a wrist specified from image data.

Next, the extractor 72 specifies a region corresponding to a wrist of the user, on the basis of the length of a line segment included in the movement region 202 obtained by scanning the inside of the rectangle region 203. For example, the extractor 72 obtains the direction of the inclination of the set rectangle region 203 with respect to the vertical direction of the image plane. The extractor 72 scans straight lines orthogonal to the direction of this inclination, in the longitudinal direction of the rectangle region 203 from the top to the bottom of the image plane, and obtains the lengths of line segments that overlap the movement region 202, as widths 204 of the hand 200. As depicted in FIG. 9, a site in which an obtained width 204 has the smallest width 206 after the largest width 205 has been acquired is specified as a region corresponding to the wrist of the hand 200.

Next, the extractor 72 extracts the region corresponding to the hand 200 of the user, on the basis of the specified region corresponding to the wrist of the user. For example, the extractor 72 extracts, within the rectangle region 203, a region of white pixels at the top side of the image plane from the specified region corresponding to the wrist, as a region 207 corresponding to the hand of the user.

Here, the extractor 72 calculates the average values for each of the X coordinates and Y coordinates of the white pixels making up the region 207 corresponding to the hand of the user, as the center of gravity 208 of the region 207 corresponding to the hand of the user. The calculated center of gravity 208 is as depicted in FIG. 9. The extractor 72 causes the calculated center of gravity 208 to be stored in the storer 6 in association with image data.

The determinator 73 determines whether or not the region 207 corresponding to the hand of the user extracted by the extractor 72 is in a stationary state. For example, the determinator 73 determines whether or not the region 207 corresponding to the hand of the user is in a stationary state, on the basis of the amount of movement of the center of gravity 208 of the region 207 extracted by the extractor 72. In more detail, the determinator 73 refers to the storer 6, and calculates the amount of movement from the center of gravity $(X_{t-1}, Y_{t-1})$ obtained by the preceding processing and the center of gravity $(X_t, Y_t)$ obtained by the current processing. Here, if the amount of movement is represented as M, the determinator 73 is able to calculate the amount of movement M by $M=\{(X_t-X_{t-1})^2+(Y_t-Y_{t-1})^2\}^{1/2}$.

The determinator 73 compares the calculated amount of movement M and a predetermined threshold value $D_{th}$. The determinator 73 determines that the hand is in a stationary state if the amount of movement M is equal to or less than the threshold value $D_{th}$, and determines that the hand is moving if the amount of movement M is greater than the threshold value $D_{th}$.

If it is determined by the determinator 73 that the region 207 corresponding to the hand of the user is in a stationary state, the recognizer 74 recognizes the shape of the region 207 corresponding to the hand of the user extracted by the extractor 72. Otherwise, if it is determined by the determinator 73 that the hand of the user is not in a stationary state, the recognizer 74 recognizes the movement of the region 207 corresponding to the hand of the user extracted by the extractor 72. The recognition of the shape of the region 207 corresponding to the hand of the user by the recognizer 74 is hereafter explained in detail.

Figure 10:
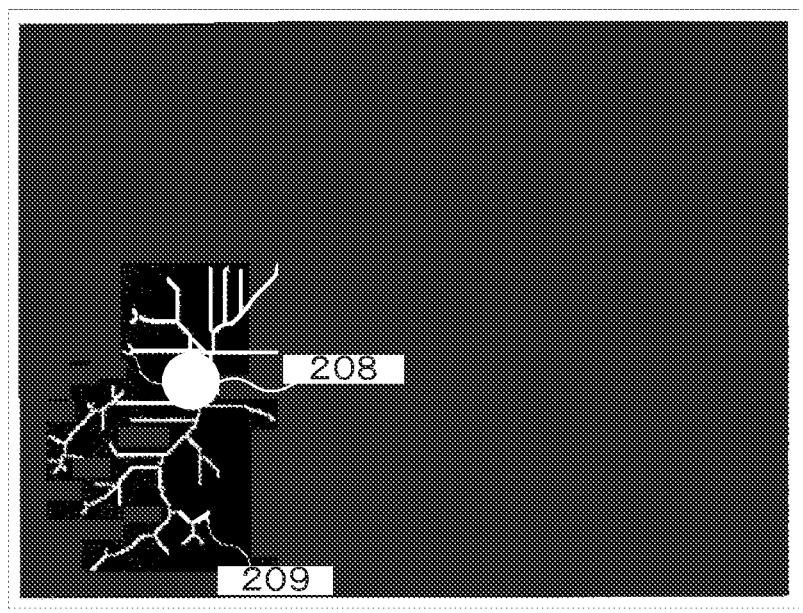
FIG. 10 is a drawing depicting a thinned image produced by thinning processing.

The recognizer 74 specifies the position of a fingertip in the region corresponding to the hand of the user extracted by the extractor 72, and on the basis of the specified fingertip position, recognizes the shape of the region 207 corresponding to the hand of the user. For example, first, the recognizer 74 specifies the position of a fingertip by carrying out thinning processing on the region 207 extracted by the extractor 72. The thinning processing is processing for converting the binarized image into a thinned image having a width of one pixel. The thinning processing is processing for emphasizing the geometric features of the captured subject. It is possible for the thinning processing to be executed using an arbitrary algorithm such as the Hilditch, Tamura, or Zhang-Suen algorithms. For example, as depicted in FIG. 10, the recognizer 74 obtains a thinned image 209 by carrying out the processing in such a way that single central pixels of the region 207 extracted by the extractor 72 remain.

Figure 11:
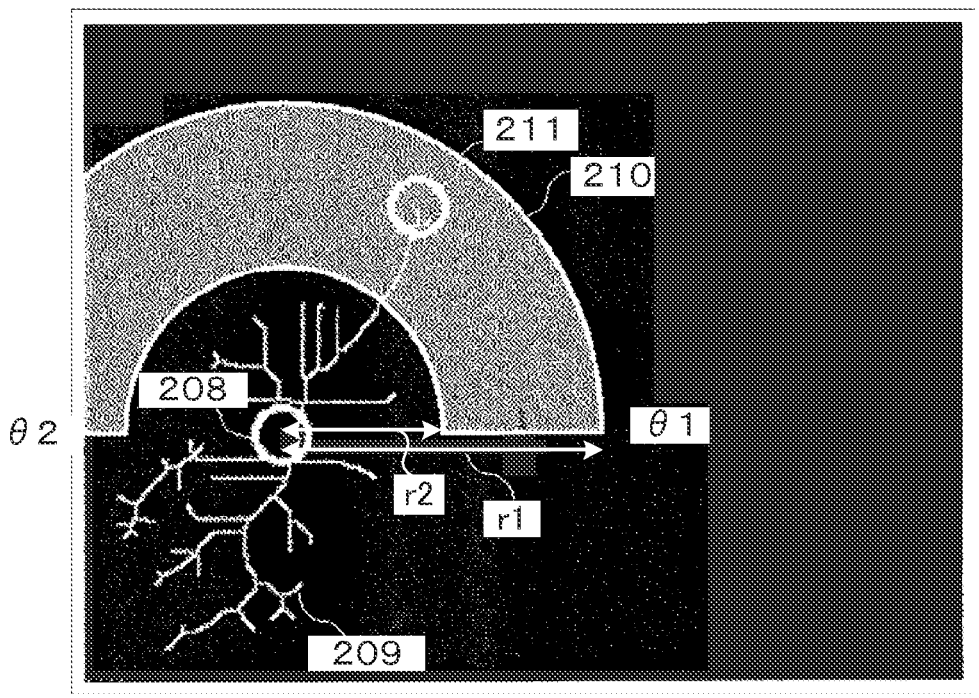
FIG. 11 is a drawing depicting a region in which a search is carried out for a fingertip.

The recognizer 74 specifies the position of a fingertip by estimating the distance between the fingertip and the center of gravity calculated from the region 207 corresponding to the hand of the user extracted by the extractor 72, on the basis of the length of a predetermined site within the region 207 corresponding to the hand of the user extracted by the extractor 72. For example, the width of a hand of a person correlates to the lengths of the fingers. Consequently, the recognizer 74 uses the widths 204 of the hand 200 obtained by the extractor 72 to estimate the distance to the fingertip. First, as depicted in FIG. 11, the recognizer 74 sets specific radii r1 and r2 (r2>r1) from the center of gravity 208, and specific angles θ1 and θ2 (θ2>θ1). The recognizer 74 then searches, in a fan-shaped range enclosed by r1, r2, θ1, and θ2 that have been set, for the tip end of the thinned image 209 extending from the position of the center of gravity 208 across a fixed distance or more, and specifies a found tip end as a fingertip position 211.

It should be noted that the radii r1 and r2 are, for example, determined by subtracting a predetermined length Δr from the largest width 205 from the position of the center of gravity 208. Furthermore, the fan-shaped range is for limiting the region in which a search is carried out for the fingertip position 211 to increase the speed of the search processing, and it is permissible to employ another technique for limiting the region in which a search is to be carried out. Alternatively, it is permissible to search the entirety from the position of the center of gravity 208 without limiting the region in which the search is to be carried out. It should be noted that, in FIG. 11, an example is depicted in which the fingertip of the index finger is specified; however, there are also cases where a plurality of fingertips are specified.

In the recognition of movement of the region 207 corresponding to the hand of the user, the recognizer 74 refers to the storer 6, and recognizes movement of the region 207 corresponding to the hand of the user, on the basis of the history $(X_{t-n}, Y_{t-n}), \ldots (X_{t-1}, Y_{t-1}), (X_t, Y_t)$ of the movement of the position of the center of gravity. Here, it is permissible for the recognizer 74 to calculate the amount of movement of the coordinates corresponding to the specified fingertip.

The inputter 75 inputs data associated with the shape or movement recognized by the recognizer 74. For example, the inputter 75 refers to the storer 6, and inputs a command associated with the shape of the hand 200 recognized by the recognizer 74. The inputter 75 compares reference data and data corresponding to the shape of the hand 200 including a specified fingertip position 211, and if the shape of the hand 200 and the shape of the hand recognized by the reference data match, the inputter 75 inputs a command associated with that reference data. For example, in the case of a command that causes the cursor C to move, the inputter 75 inputs a cursor C movement instruction to the display 3. Thus, the cursor C within the gesture input support window 3W of the display 3 moves.

In the case where a movement of the hand 200 is recognized by the recognizer 74, for example, the inputter 75 inputs, to the display 3, an instruction for moving the cursor C upward if the hand 200 has moved upward. Thus, the cursor C within the gesture input support window 3W of the display 3 moves upward.

Next, the flow of the input processing by the information processing device 100 is described. The information processing device 100 is able to execute a variety of application software. For input to an application software, the information processing device 100, as described hereafter, carries out input processing in the case where a user has carried out input by means of a gesture, in addition to input processing from the operator 1.

Figure 12:
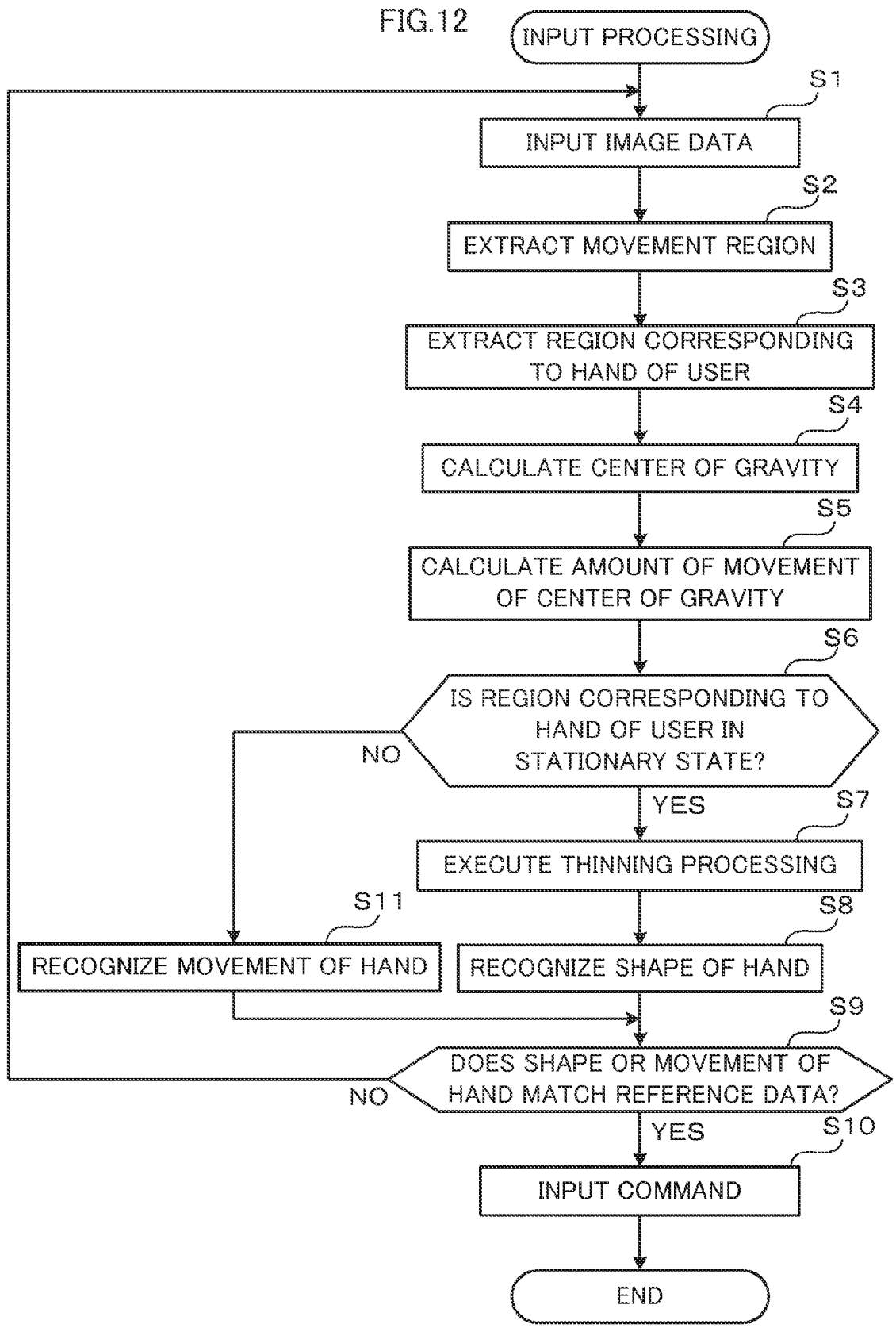
FIG. 12 is a flowchart of input processing.

The controller 7 repeatedly executes input processing depicted in FIG. 12 in a time-divided manner for example. It should be noted that it is permissible for the controller 7 to be configured in such a way as to display the gesture input support window 3W together with the start of the input processing, or to switch the displaying and non-displaying of the gesture input support window 3W by means of a gesture or input from the operator 1.

The image inputter 71 inputs image data to the controller 7 (step S1). Next, the extractor 72 extracts a movement region 201 (step S2). Then, the extractor 72 extracts a region 207 corresponding to a hand of the user (step S3). The extractor 72 calculates the center of gravity 208 of the region 207 corresponding to the hand of the user (step S4).

The determinator 73 calculates the amount of movement of the center of gravity 208 (step S5). Then, the determinator 73 determines whether or not the region 207 corresponding to the hand of the user is in a stationary state, on the basis of the amount of movement of the center of gravity 208 (step S6).

If the region 207 corresponding to the hand of the user is in a stationary state (step S6: YES), the recognizer 74 executes thinning processing (step S7). Then, the recognizer 74 recognizes the shape of the hand 200 by specifying a fingertip position 211 (step S8). If the shape of the hand 200 does not match reference data (step S9: NO), the controller 7 returns to step S1. Otherwise, if the shape of the hand 200 does match the reference data (step S9: YES), the inputter 75 inputs a command associated with the shape of the hand 200 recognized by the recognizer 74 (step S10). Then, the controller 7 finishes the input processing.

Otherwise, if the region 207 corresponding to the hand of the user is not in a stationary state (step S6: NO), the recognizer 74 calculates the amount of movement of the center of gravity 208, and recognizes the movement of the hand of the user (step S11). Then, if the movement of the hand 200 does not match the reference data (step S9: NO), the controller 7 returns to step S1. If the movement of the hand 200 does match the reference data (step S9: YES), the inputter 75 inputs a command associated with the movement of the hand 200 recognized by the recognizer 74 (step S10). Then, the controller 7 finishes the input processing.

As described in detail above, according to the information processing device 100 according to the present mode of embodiment, it is determined whether or not the hand 200 is stationary, and if in a stationary state, data is input on the basis of the shape of the hand 200. Thus, it is possible to prevent, to the utmost extent, a decline in recognition accuracy due to a residual image in an image of the hand 200 that is not stationary, and the generation of erroneous input that accompanies this. Furthermore, because an image of a stationary hand 200 is used, the region of the hand 200 is able to be accurately recognized, and, therefore, there is little processing load, and it is possible to prevent, to the utmost extent, the influence of external noise and the generation of erroneous input that accompanies this. Therefore, a user is able to input data with higher accuracy.

It should be noted that, in the present mode of embodiment, the recognizer 74 is configured in such a way as to recognize the shape of the region 207 corresponding to the hand of the user by specifying a fingertip position 211 in the region 207 extracted by the extractor 72. By doing this, the region 207 corresponding to the hand is able to be suitably clipped from image data, and it is therefore possible for the influence of noise of the image and so on captured other than the hand 200 to be suppressed to the utmost extent. Furthermore, because a fingertip is a site that often moves in gesture input, by accurately specifying the fingertip position 211, it becomes possible to input a variety of data.

Furthermore, in the present mode of embodiment, the recognizer 74 is configured in such a way as to specify the fingertip position 211 by carrying out thinning processing on the region 207 extracted by the extractor 72. Due to the thinning processing, it becomes easier for the geometric features of the image to be captured, and it is therefore possible to specify the fingertip position 211 with higher accuracy.

Furthermore, due to the thinning processing, the image is converted into lines, and it is therefore possible to suppress the amount of data that is processed, and to increase the speed of the processing.

It should be noted that, in the present mode of embodiment, the recognizer 74 is configured in such a way as to specify the fingertip position 211 by estimating the distance from the center of gravity 208 of the region 207 extracted by the extractor 72 to the fingertip, on the basis of the width 204 of the hand within the region 207 extracted by the extractor 72. Because the width of the hand and the length of the fingers to the tip ends usually correlate, it is possible to accurately estimate the fingertip position 211 by the size of the hand of an individual person.

Furthermore, in the present mode of embodiment, the determinator 73 is configured in such a way as to determine whether or not the hand 200 of the user is in a stationary state, on the basis of the amount of movement of the center of gravity 208 of the region 207 extracted by the extractor 72. By doing this, it is possible to determine with a high degree of accuracy whether or not the hand 200 is in a stationary state.

It should be noted that, in the present mode of embodiment, the recognizer 74 is configured in such a way as to, if it is determined by the determinator 73 that the hand 200 of the user is not in a stationary state, recognize the movement of the region 207 extracted by the extractor 72, and the inputter 75 is configured in such a way as to input a command associated with the movement recognized by the recognizer 74. Thus, because it is possible to input data also by the movement of the hand 200 and not just the shape of the hand 200, it is possible for the types of data that are able to be input by gestures to be increased. As a result, because many types of data are able to be input by gestures, convenience for the user is improved.

In addition, in the present mode of embodiment, the extractor 72 is configured in such a way as to set the rectangle region 203 that circumscribes the movement region 202 obtained from difference data between frames in the image data input by the image inputter 71, to specify a region corresponding to a wrist of the user on the basis of the length of a line segment included in the movement region 202 obtained by scanning the inside of the rectangle region 203, and on the basis of the specified region corresponding to the wrist of the user, to extract the region 207 corresponding to the hand 200 of the user. By doing this, the extractor 72 is able to accurately extract the region of the hand 200. In addition, the influence of noise of the image and the like captured other than the hand 200 is able to be suppressed to the utmost extent.

It should be noted that, as depicted in FIG. 13, it is permissible for the display 3 to be configured in such a way as to display an image corresponding to the image data input by the image inputter 71, in the gesture input support window 3W. By doing this, because the user is able to carry out operational input while confirming the gesture by the hand 200, the user is able to input data more reliably.

It should be noted that, in the mode of embodiment, it is configured such that data is input on the basis of the recognized movement of the hand 200 if the hand 200 is not in a stationary state, and that data is input on the basis of the recognized shape of the hand 200 if the hand 200 is in a stationary state. However, the present invention is not restricted to this.

For example, it is permissible for the determinator 73 to be configured in such a way as to obtain a movement speed V (=L/T) from a movement amount L of the center of gravity 208 of the hand 200 in image data of frame units of time T intervals. In this case, the recognizer 74 inputs data on the basis of the movement of the hand 200 if the movement speed V is greater than a first threshold value V1. Furthermore, the recognizer 74 inputs data on the basis of the combination of the movement of the hand 200 and the shape and direction of the hand 200 if the movement speed V is between the first threshold value V1 and a second threshold value V2 (V1>V>V2). Furthermore, the recognizer 74 inputs data on the basis of the shape and the direction of the hand 200 if the movement speed V is less than the second threshold value V2 (V2>V; in other words, a substantially stopped state). In this way also, a gesture by the hand 200 is able to be recognized with a high degree of accuracy, and data is able to be suitably input. It should be noted that it is permissible to provide three or more threshold values for speed.

Figure 14:
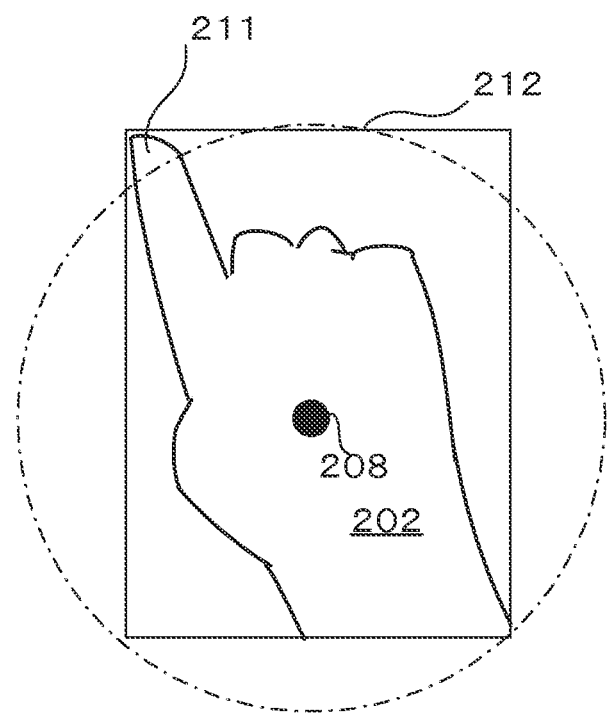
FIG. 14 is a drawing depicting a rectangle region including a hand region.

Furthermore, the method for extracting the region 207 corresponding to the hand 200 of the user, the method for calculating the center of gravity 208, and the method for specifying the fingertip position 211, and the like are not restricted to the aforementioned mode of embodiment. For example, with regard to the region 207 corresponding to the hand 200 of the user, it is permissible for a portion having a specific color (skin color) within an image to be extracted. Furthermore, in order to extract the region 207 corresponding to the hand 200 of the user, for example, it is permissible for the extractor 72 to set the smallest rectangle region 212 including the specified movement region 202, in such a way as depicted in FIG. 14. In this case, it is permissible for the extractor 72 to extract a region of white pixels at the top side of the image plane from the center of gravity 208, as the region 207 corresponding to the hand of the user. Furthermore, the technique for determining whether or not there is movement of the hand 200 is also arbitrary. For example, it is permissible for a value to which the amount of movement or speed are linked to be obtained without obtaining the actual amount of movement or speed, and for this to be compared with a reference value, and the like.

Furthermore, in the specification of the fingertip position 211, for example, as depicted in FIG. 14, it is permissible for the recognizer 74 to specify, as the fingertip position 211, the position of a pixel that is the furthest (having a large distance) from the center of gravity 208 at the top side of the image plane from the center of gravity 208, within the pixels making up the image.

Furthermore, in the step S10 of FIG. 12, the inputter 75 has input a command associated with the shape or movement of the hand 200 recognized by the recognizer 74. Without being restricted to this, it is permissible for the inputter 75 to cause data corresponding to the recognized shape or movement of the hand 200 to be stored in the storer 6, and to refer to the storer 6 and input a command or the like in conjunction with other processing such as operational input implemented by way of the operator 1.

In the mode of embodiment, an example has been given of a configuration in which the camera 2 is provided; however, it is also possible for the present invention to be applied to a system in which image data captured by the camera 2 is received by way of data communication or is acquired by way of a recording medium or the like, and the image data is processed.

It should be noted that the gestures by the hand 200 such as the movements or shapes of the hand 200 depicted in FIG. 3 to FIG. 5C are examples and the gestures are not restricted to these.

It is permissible for the information processing device 100 of the present mode of embodiment to be implemented by means of a dedicated system, or to be implemented by means of a normal computer system. For example, it is permissible to store and distribute a program for executing the aforementioned operations on a computer-readable recording medium, and to configure an input device 100 by installing the program on a computer, and executing the aforementioned processing. Furthermore, it is permissible to make it possible to store on a disk device provided in a server device on a network such as the Internet, and to download and the like to a computer for example. Furthermore, implementing the aforementioned functions by collaboration between an OS (operating system) and application software is permissible. In this case, it is permissible for only portions other than the OS to be stored and distributed on a medium, and, furthermore, for those portions to be downloaded and the like to a computer.

As a recording medium that records the program, it is possible to use a computer-readable recording medium such as a USB memory, flexible disk, CD, DVD, Blu-ray Disc (registered trademark), MO, SD card, Memory Stick (registered trademark), as well as a magnetic disk, optical disk, magneto-optical disk, semiconductor memory, or magnetic tape. Furthermore, it is possible to use a recording medium such as a hard disk or a SSD (solid state drive) that is normally used fixed in a system or device.

It is possible for the present invention to have a various types of modes of embodiment and modifications without departing from the broad spirit and scope of the present invention. Furthermore, the aforementioned mode of embodiment is for describing the present invention, and does not restrict the scope of the present invention. In other words, the scope of the present invention is indicated by the scope of the claims, not the mode of embodiment. Various types of modifications implemented within the scope of the claims and within the scope of the meaning of the invention that is equivalent to the scope of the claims are deemed to be within the scope of the present invention.

It is possible for some or all of the aforementioned mode of embodiment to be described also as in the following appendices, but is not restricted to the following.

(Appendix 1)

An information processing device comprising:

an image inputter that inputs image data in which a subject has been captured;

an extractor that extracts a region corresponding to a hand of the subject included in the image data input by the image inputter;

a determinator that determines whether or not the region corresponding to the hand of the subject extracted by the extractor is in a stationary state;

a recognizer that, if the region corresponding to the hand of the subject is determined by the determinator as being in a stationary state, recognizes the shape of the region corresponding to the hand of the subject extracted by the extractor; and an inputter that inputs data associated with the shape recognized by the recognizer.

(Appendix 2)

The information processing device according to Appendix 1, wherein the recognizer specifies the position of a fingertip in the region corresponding to the hand of the subject extracted by the extractor, and on the basis of the specified position of the fingertip, recognizes the shape of the region corresponding to the hand of the subject.

Appendix 3)

The information processing device according to Appendix 2, wherein the recognizer specifies the position of the fingertip by carrying out thinning processing on the region corresponding to the hand of the subject extracted by the extractor.

Appendix (4)

The information processing device according to Appendix 2 or 3, wherein, on the basis of the length of a predetermined site within the region corresponding to the hand of the subject extracted by the extractor, the recognizer specifies the position of the fingertip by estimating the distance between the fingertip and a center of gravity calculated from the region corresponding to the hand of the subject extracted by the extractor.

Appendix (5)

The information processing device according to any one of Appendices 1 to 4, wherein the determinator determines whether or not the hand of the subject is in a stationary state, on the basis of the amount of movement of the center of gravity of the region corresponding to the hand of the subject extracted by the extractor.

Appendix (6)

The information processing device according to any one of Appendices 1 to 5, wherein, if it is determined by the determinator that the hand of the subject is not in a stationary state, the recognizer recognizes movement of the region corresponding to the hand of the subject extracted by the extractor, and the inputter inputs data associated with the movement recognized by the recognizer.

Appendix (7)

The information processing device according to any one of Appendices 1 to 6, wherein the extractor sets a rectangle that circumscribes a movement region obtained from difference data between frames in the image data input by the image inputter, specifies a region corresponding to a wrist of the subject, on the basis of the length of a line segment included in the movement region obtained by scanning the inside of the rectangle, and extracts the region corresponding to the hand of the subject, on the basis of the specified region corresponding to the wrist of the subject.

Appendix (8)

The information processing device according to any one of Appendices 1 to 7, further comprising a display that displays an image corresponding to the image data input by the image inputter.

Appendix (9)

An information processing method including:

an image input step for inputting image data in which a subject has been captured;

an extraction step for extracting a region corresponding to a hand of the subject included in the image data input in the image input step;

a determination step for determining whether or not the region corresponding to the hand of the subject extracted in the extraction step is in a stationary state;

a recognizing step for, if the region corresponding to the hand of the subject is determined in the determination step as being in a stationary state, recognizing the shape of the region corresponding to the hand of the subject extracted in the extraction step; and an execution step for inputting data associated with the shape recognized in the recognizing step.

Appendix (10)

A recording medium on which a program is recorded, the program causing a computer to function as:

an image inputter that inputs image data in which a subject has been captured;

an extractor that extracts a region corresponding to a hand of the subject included in the image data input by the image inputter;

a determinator that determines whether or not the region corresponding to the hand of the subject extracted by the extractor is in a stationary state;

a recognizer that, if the region corresponding to the hand of the subject is determined by the determinator as being in a stationary state, recognizes the shape of the region corresponding to the hand of the subject extracted by the extractor; and an inputter that inputs data associated with the shape recognized by the recognizer.

The present invention is based upon Japanese Patent Application No. 2011-102529 filed on Apr. 28, 2011. The entirety of the specification, scope of the patent claims, and drawings of Japanese Patent Application No. 2011-102529 is incorporated within the present specification as a reference.

INDUSTRIAL APPLICABILITY

The present invention is suitable for an information processing device, an information processing method, and a recording medium, with which data is input by means of a gesture of a subject.

REFERENCE SIGNS LIST

1 Operator
2 Camera
3 Display
3W Gesture input support window
3i Window
4 Camera interface
5 Display interface
6 Storer
7 Controller
8 Bus
71 Image inputter
72 Extractor
73 Determinator
74 Recognizer
75 Inputter
100 Information processing device
200 Hand
201, 202 Movement region
203, 212 Rectangle region
204 Width
205 Largest width
206 Smallest width
207 Region corresponding to hand of user
208 Center of gravity
209 Thinned image
201 Fan-shaped region
211 Fingertip position

The invention claimed is:

1. An information processing device comprising:
an image inputter configured to input image data in which a user has been captured;
an extractor configured to extract a region corresponding to a hand of the user included in the image data input by the image inputter;
a determinator configured to determine whether or not the region corresponding to the hand of the user extracted by the extractor is in a stationary state;
a recognizer configured to, if the region corresponding to the hand of the user is determined by the determinator as being in a stationary state, recognize the shape of the region corresponding to the hand of the user extracted by the extractor; and
an inputter configured to input data associated with the shape recognized by the recognizer,
wherein the extractor is further configured to set a rectangle that circumscribes a movement region obtained from difference data between frames in the image data input by the image inputter, specify a region corresponding to a wrist of the user, on the basis of a width of the hand included in the movement region obtained by scanning the inside of the rectangle, and extract the region corresponding to the hand of the user, on the basis of the specified region corresponding to the wrist of the user.

2. The information processing device according to claim 1, wherein
the recognizer is further configured to specify the position of a fingertip in the region corresponding to the hand of the user extracted by the extractor, and on the basis of the specified position of the fingertip, to recognize the shape of the region corresponding to the hand of the user.

3. The information processing device according to claim 2, wherein
the recognizer is further configured to specify the position of the fingertip by carrying out thinning processing on the region corresponding to the hand of the user extracted by the extractor.

4. The information processing device according to claim 2, wherein,
the recognizer is further configured to specify, on the basis of the width of the hand within the region corresponding to the hand of the user extracted by the extractor, the position of the fingertip by estimating the distance between the fingertip and a center of gravity calculated from the region corresponding to the hand of the user extracted by the extractor.

5. The information processing device according to claim 1, wherein
the determinator is further configured to determine whether or not the hand of the user is in a stationary state, on the basis of the amount of movement of the center of gravity of the region corresponding to the hand of the user extracted by the extractor.

6. The information processing device according to claim 1, wherein,
the recognizer is further configured to, if it is determined by the determinator that the hand of the user is not in a stationary state, movement of the region corresponding to the hand of the user extracted by the extractor, and
the inputter is further configured to input data associated with the movement recognized by the recognizer.

7. The information processing device according to claim 1, further comprising
a display configured to display an image corresponding to the image data input by the image inputter.

8. An information processing method including:
an image input step for inputting image data in which a subject has been captured;
an extraction step for extracting a region corresponding to a hand of the user included in the image data input in the image input step;

a determination step for determining whether or not the region corresponding to the hand of the user extracted in the extraction step is in a stationary state;

a recognizing step for, if the region corresponding to the hand of the user is determined in the determination step as being in a stationary state, recognizing the shape of the region corresponding to the hand of the user extracted in the extraction step; and an input step for inputting data associated with the shape recognized in the recognizing step, wherein the extraction step further includes setting a rectangle that circumscribes a movement region obtained from difference data between frames in the image data input in the image input step, specifying a region corresponding to a wrist of the user, on the basis a width of the hand included in the movement region obtained by scanning the inside of the rectangle, and extracting the region corresponding to the hand of the user, on the basis of the specified region corresponding to the wrist of the user.

9. A non-transitory recording medium on which a program is recorded, the program causing a computer to function as:

an image inputter configured to input image data in which a subject has been captured;

an extractor configured to extract a region corresponding to a hand of the user included in the image data input by the image inputter;

a determinator configured to determine whether or not the region corresponding to the hand of the user extracted by the extractor is in a stationary state;

a recognizer configured to, if the region corresponding to the hand of the user is determined by the determinator as being in a stationary state, recognize the shape of the region corresponding to the hand of the user extracted by the extractor; and an inputter configured to input data associated with the shape recognized by the recognizer, wherein the extractor is further configured to set a rectangle that circumscribes a movement region obtained from difference data between frames in the image data input by the image inputter, specify a region corresponding to a wrist of the user, on the basis of a width of the hand included in the movement region obtained by scanning the inside of the rectangle, and extract the region corresponding to the hand of the user, on the basis of the specified region corresponding to the wrist of the user.

* * * * *